(12) United States Patent
Hess

(10) Patent No.: US 8,407,358 B1
(45) Date of Patent: Mar. 26, 2013

(54) BUFFER MANAGEMENT FOR STREAMING DATA

(75) Inventor: William C. Hess, Seattle, WA (US)

(73) Assignee: Intel Corporation, Santa Clara, CA (US)

( * ) Notice: Subject to any disclaimer, the term of this patent is extended or adjusted under 35 U.S.C. 154(b) by 2608 days.

(21) Appl. No.: 10/323,610

(22) Filed: Dec. 18, 2002

(51) Int. Cl.
  G06F 15/16 (2006.01)
  H04L 12/54 (2006.01)
  H04L 12/56 (2006.01)
(52) U.S. Cl. ......... 709/231; 709/219; 370/429; 370/412
(58) Field of Classification Search .................. 709/231, 709/219; 370/412, 429
  See application file for complete search history.

(56) References Cited

U.S. PATENT DOCUMENTS

| 6,845,398 B1* | 1/2005 | Galensky et al. ............. 709/231 |
| 6,937,988 B1* | 8/2005 | Hemkumar et al. .......... 704/500 |
| 7,336,678 B2* | 2/2008 | Vinnakota et al. ............ 370/429 |
| 7,937,735 B2* | 5/2011 | Avison ............................. 725/90 |
| 2003/0067872 A1* | 4/2003 | Harrell et al. ................. 370/229 |
| 2003/0103460 A1* | 6/2003 | Kamath et al. ............. 370/236.2 |
| 2003/0165150 A1* | 9/2003 | Zimmermann et al. ...... 370/412 |

OTHER PUBLICATIONS

Wang et al., "A Control-Theoretic Method for Rate-based Flow Control of Multimedia Communication", Multimedia, Internet, Video Technologies, 2001—iis.sinica.edu.tw.*
Blanchini, Franco, et al., "Robust Rate Control for Integrated Services Packet Networks," IEEE/ACM Transactions on Networking, vol. 10, No. 5, Oct. 2002, pp. 644-652.

* cited by examiner

*Primary Examiner* — Wen-Tai Lin
(74) *Attorney, Agent, or Firm* — ÆON Law; Adam L. K. Philipp

(57) ABSTRACT

A client receives streaming data from a server at a first data rate and buffers the streaming data in a buffer having a finite size. The client consumes the streaming data from the buffer at a second data rate. The second data rate is variable. Based on a data depth of the buffer relative to a reference data depth, the client generates a sequence of signals and sends the sequence of signals to the server to dynamically adjust the first data rate. The sequence of signals influences the data depth of the buffer toward the reference data depth.

45 Claims, 9 Drawing Sheets

BUFFER MANAGEMENT FOR STREAMING DATA

FIELD OF THE INVENTION

The present invention relates to the field of streaming data. More specifically, the present invention relates to buffer management for streaming data.

BACKGROUND

Streaming data, as the term is used herein, refers to a particular approach to providing content stored on a server (such as a web server) to a client (such as a personal computer) over a network connection. Streaming data is similar, in many respects, to downloading data in the traditional sense. In a traditional download, an entire file is usually downloaded before the file can be accessed. Streaming data, however, can be accessed as the data is received. For instance, rather than spending several minutes or hours to download a broadcast news segment over the Internet before viewing the news segment, the news segment can be streamed to a client and the client can decode and play the news segment in real time as the data is received.

Streaming data is more than just a progressive download though. A progressive download may begin playing a file before the entire file is downloaded, but the rate at which the file is played (the consumption rate) is not managed with respect to the rate at which the file is downloaded (the data rate). That is, in a progressive download, if the rate at which the data is received exceeds the rate at which the data is played, enough memory must be available to buffer the accumulated data. Conversely, if the rate at which the data is received is less than the rate at which the data is played, the presentation may have breaks or pauses while waiting for more data to arrive. For streaming data, however, the consumption rate is managed with respect to the data rate to reduce or eliminate breaks or pauses in a presentation, and to maintain the amount of buffered data within certain parameters.

Streaming data has countless applications and promises to revolutionize entire industries. For instance, movies and television programming can be stored on a server and made available over the Internet for clients to access at their discretion and in real time. There is no need for a client to adhere to a broadcast schedule, nor does a client have to wait long periods of time to download content before playing.

Of course, processing streaming data in real time can be more resource intensive than traditional downloading or progressive downloading. Many personal computers (PCs) these days are more than capable of handling streaming data. For instance, a typical PC system may include a cable modem or digital subscriber line (DSL), a processor speed of 300 Mega hertz per second or better, and free hard disk space on the order of hundreds of Mega bytes. With plentiful resources like these, a system will usually be able to handle most streaming data with little or no pauses in the presentation and with plenty of memory available to buffer accumulated data. In other words, managing the consumption rate compared to the data rate does not have to be very precise when using a system with plentiful resources.

Not all systems, however, have plentiful resources. For instance, portable wireless devices and special purpose devices often have comparatively limited resources. Memory space on a cellular phone, personal data assistant (PDA), or mobile email device, for example, may be on the order of 2 megabytes compared to hundreds of megabytes on a PC. Similarly, a set-top box or cable box may have relatively little memory compared to the data rate available over DSL or cable modem. Resource restrictions on devices such as these can be particularly problematic when it comes to managing streaming data, but these devices make up a huge and ever growing segment of the market for streaming data.

BRIEF DESCRIPTION OF DRAWINGS

Examples of the present invention are illustrated in the accompanying drawings. The accompanying drawings, however, do not limit the scope of the present invention. Similar references in the drawings indicate similar elements.

DETAILED DESCRIPTION OF THE INVENTION

In the following detailed description, numerous specific details are set forth in order to provide a thorough understanding of the present invention. However, those skilled in the art will understand that the present invention may be practiced without these specific details, that the present invention is not limited to the depicted embodiments, and that the present invention may be practiced in a variety of alternative embodiments. In other instances, well known methods, procedures, components, and circuits have not been described in detail.

Parts of the description will be presented using terminology commonly employed by those skilled in the art to convey the substance of their work to others skilled in the art. Also, parts of the description will be presented in terms of operations performed through the execution of programming instructions. As well understood by those skilled in the art, these operations often take the form of electrical, magnetic, or optical signals capable of being stored, transferred, combined, and otherwise manipulated through, for instance, electrical components.

Various operations will be described as multiple discrete steps performed in turn in a manner that is helpful for understanding the present invention. However, the order of description should not be construed as to imply that these operations are necessarily performed in the order they are presented, nor even order dependent. Lastly, repeated usage of the phrase "in one embodiment" does not necessarily refer to the same embodiment, although it may.

Overview

Embodiments of the present invention improve data buffer management for streaming data on devices that have limited resources. Data buffer management is one of the primary hurdles to providing streaming data on these restricted platforms with little or no errors in the presentation. Buffer management errors in streaming data may include pauses or breaks in the presentation due to consuming data faster than the data is received, as well as skips or lost segments due to receiving data faster than it is consumed.

Figure 1:
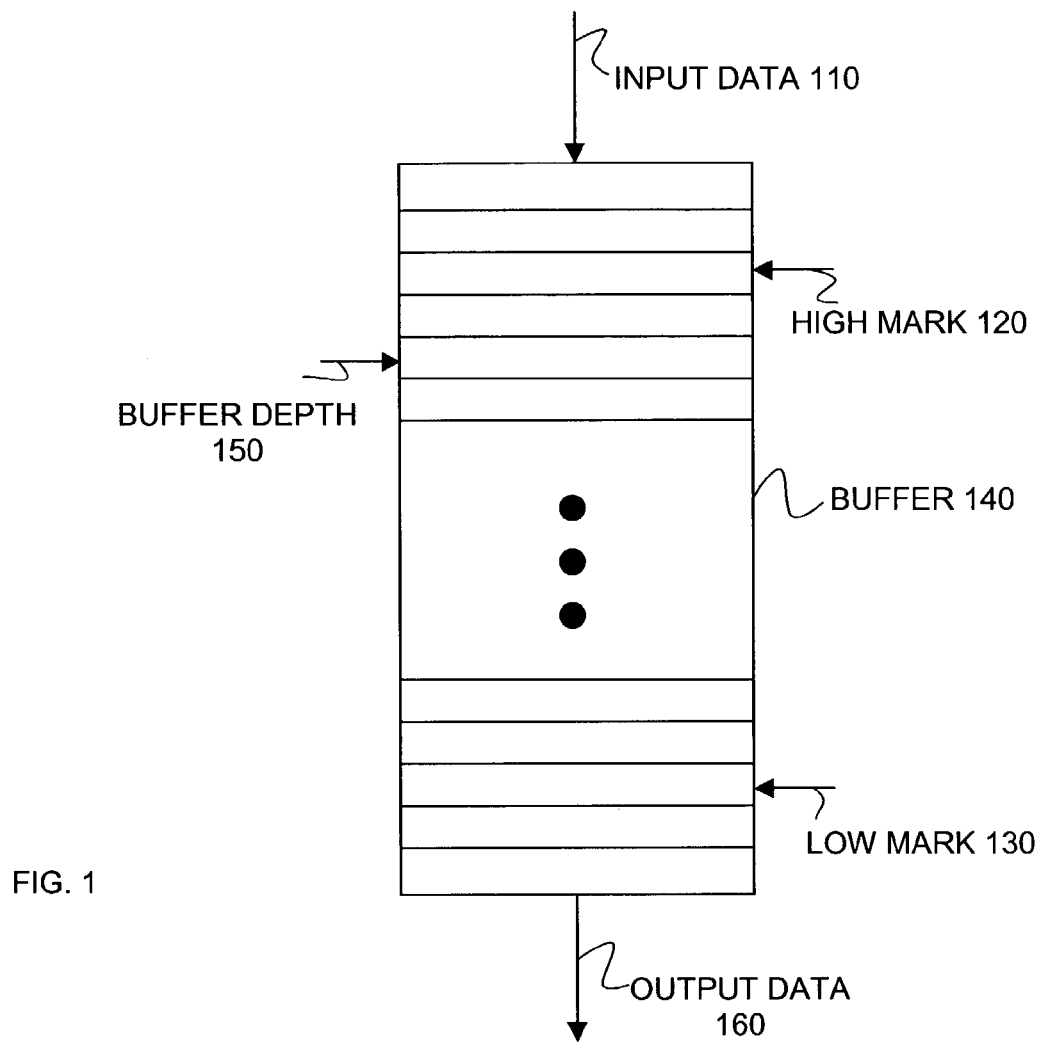
FIG. 1 illustrates one embodiment of a data buffer for streaming data.

FIG. 1 illustrates one example of a data buffer, buffer 140, that may be used in a client to receive streaming data from a server. A client may be broadly defined to mean any device or software that receives streaming data, and a server may be broadly defined to mean any device or software to provide the streaming data to the client.

Input data 110 flows into buffer 140 at a particular instantaneous rate (called the data rate). Input data 110 is the stream of data from the server (not shown). As output data 160 flows out of buffer 140, the data is said to be "consumed." The data may be consumed at a different instantaneous rate (called the consumption rate) than the data rate of the input data. The consumption rate can vary substantially, especially for certain formats of video presentation. The variability can also be very difficult to predict, especially during real time processing.

Buffer 140 is intended to "smooth-out" the data stream so that the data can be consumed with little or no errors. That is, in the ideal situation, the average data rate of input data 110 equals the average consumption rate of output data 160 as the instantaneous data and/or consumption rates change. As the consumption rate increases and decreases, the data rate should maintain the amount of data, or "data depth," in the buffer so that the data depth may fluctuate up and down, but the buffer does not run out of data or run out of space for more data. If buffer 140 runs out of space, the buffer is said to overflow. If buffer 140 overflows, some data may be lost, causing part of the data presentation to be skipped. If buffer 140 runs out of data, the buffer is said to underflow. If buffer 140 underflows, the data presentation may be interrupted. In either situation, quality of the presentation suffers.

A key to managing buffer depth in any buffer is to keep the buffer depth well away from the limits of the buffer. If the size of buffer 140 is large compared to the data rate, having room to store several seconds worth of data for instance, and/or if the size of buffer 140 can be adjusted to change the limits of the buffer as needed, any number of prior approaches can be used to manage the data depth in the buffer.

One prior approach to managing data depth in a buffer uses a high mark 120, a low mark 130, and a buffer depth 150. Buffer depth 150 tracks the amount of data in buffer 140. Buffer depth 150 increases when the consumption rate of output data 160 is less than the data rate of input data 110. If buffer depth 150 equals the size of buffer 140, the buffer overflows. On the other hand, buffer depth 150 decreases when the consumption rate of output data 160 is greater than the data rate of input data 110. If buffer depth 150 goes to zero, or reaches the bottom of buffer 140, the buffer underflows.

If the size of buffer 140 is fixed and the consumption rate of output data 160 is variable and uncontrollable, only the data rate of input data 110 can be adjusted to manage buffer depth 150. Therefore, when buffer depth 150 reaches high mark 120, a command can be sent to the server to stop or reduce the data rate of input data 110. Ideally, buffer 140 has enough room above high mark 120 to continue to store data during the time it takes to change the data rate of input data 110.

Similarly, when buffer depth 150 reaches low mark 130, a command can be sent to the server to resume or increase the data rate of input 110. Ideally, buffer 140 stores enough data below low mark 130 to continue providing data during the time it takes to change the data rate of input data 110.

Unfortunately, this approach may be inadequate for many devices having limited buffer sizes. With a limited buffer size, the space between the high mark and the top of the buffer, and the space between the low mark and the bottom of the buffer, cannot be of arbitrarily size, and must have fixed bounds. These fixed bounds control and limit the range of consumption rate changes that the buffer can absorb. If the range and variability of the input data rate is also limited, the situation becomes even more difficult to manage. No matter where the high and low marks are positioned, there may be no solution that adequately manages underflow and overflow for a buffer having a particular finite size.

Embodiments of the present invention apply dynamic control theory to buffer depth management for streaming data. Dynamic control theory provides more sophisticated control solutions for buffer management, making quality streaming data possible on many devices having limited resources. Rather than allowing the buffer depth to drift to a high mark or a low mark before taking action to adjust the data depth, embodiments of the present invention use dynamic, Nth order control systems that strive to keep the buffer depth near a reference buffer depth.

For instance, if the reference buffer depth is equal to half the size of the buffer, one embodiment of the present invention will take steps to increase the buffer depth whenever the buffer is detected to be less than half full, and take steps to decrease the buffer depth whenever the buffer is detected to be more than half full. This maximizes the size of both the upper and lower bounds for the buffer, making each bound one-half of the buffer size.

In various embodiments of the present invention, the control commands are "dynamic" in that the amount of "force" indicated by the commands increases as the buffer depth gets farther away from the reference depth. For example, if the buffer depth is just slightly below the reference depth, the control system may call for a small increase in the input data rate. If, however, the buffer depth is significantly below the reference depth, the control system may call for a much larger increase in the input data rate.

Example Control System

Figure 2:
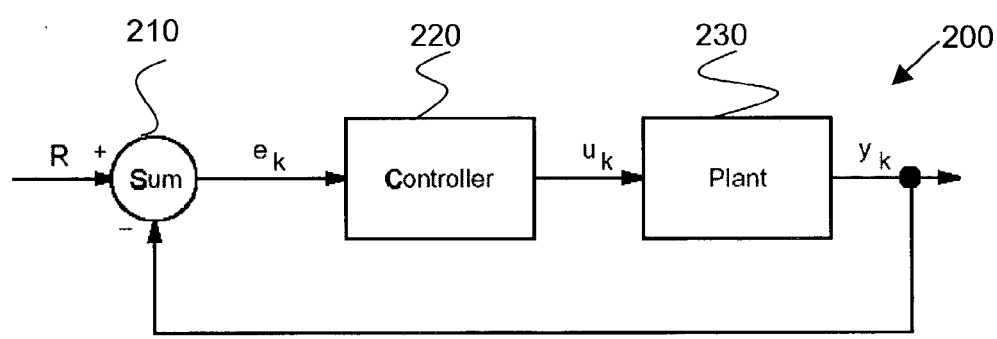
FIG. 2 illustrates one embodiment of a buffer management system.

FIG. 2 illustrates one embodiment of a control system 200 for a streaming data client buffer, such as buffer 140 from FIG. 1. Control system 200 includes a controller 220, a plant 230, and a summer 210. Plant 230 represents the server and the client buffer, both of which are used in the control system to manage the buffer depth.

Plant 230 receives an input stream, $u_k$, of dynamic control commands to the server. The commands tell the server what data rate to use for the input data. In one embodiment, the data rate can be any value in a range from 1 bit per second up to the maximum data rate for the network connection, although the minimum data rate is often limited to 1000 bits per second. For one embodiment of a wireless network connection, the maximum data rate is approximately 30 kilobits per second.

Since the rate at which data is consumed out of the buffer may be variable, difficult to predict, and difficult to control directly, the only output from plant 230 that is utilized by control system 200 is a stream of sampled buffer depths, $y_k$.

In each of the streams of values described with respect to control system 200, the value k indicates a value in the respective stream for a particular sample of the buffer depth. Samples are taken with a period T. In one embodiment, the sample period T may be the shortest duration allowed in the given network environment between control commands from the client to the server. For one embodiment of a wireless network connection, the period T is five seconds. In other words, a sample of the buffer depth is taken once every five seconds and a control command is supplied to plant 230 once every five seconds. Each incremental value of k indicates a different value in a given stream of values, and the values change once every T seconds at most.

Referring again to the embodiment of FIG. 2, summer 210 determines the difference between the current buffer depth, $y_k$, and a reference buffer depth R to generate a stream of error values, $e_k$. The stream of error values are provided to controller 220 to generate the stream of dynamic control commands, $u_k$.

In one embodiment, the reference buffer depth R may be supplied by the server device, or derived by the client based on configuration parameters supplied by the server, prior to the start of a streaming presentation. R is usually the starting point for a streaming presentation. That is, a streaming data buffer is often preloaded up to the R depth before starting the streaming presentation. R can be determined in any number of ways, and may be dependent upon a variety of factors including the size of the buffer on the client, the speed and reliability of the network connection, the type of buffer management being used, and the type of data being streamed.

Figure 3:
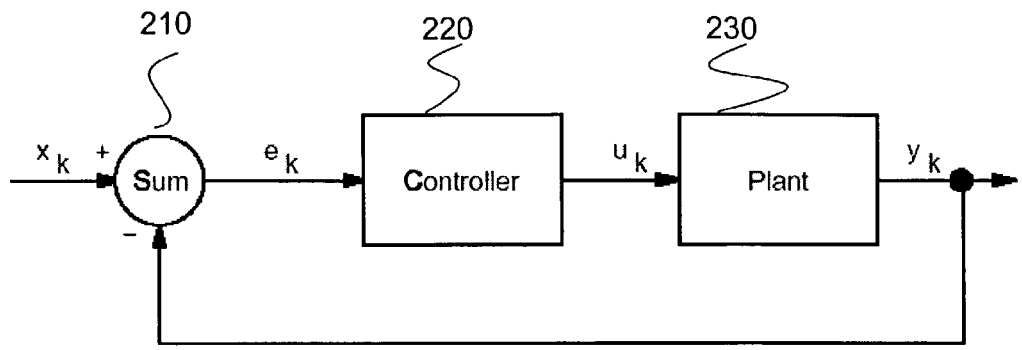
FIG. 3 illustrates a modified version of the embodiment of FIG. 2 using a variable input to enable a closed form transfer function.

Control system 200 strives to maintain the buffer depth $y_k$ at the reference depth R. In order to derive the control function for controller 220, a transfer function is needed. A closed form transfer function may be not possible, however, using the fixed reference value R. That is, there may be no way to specify how the system should change the output $y_k$ for a given change in the input when the input is a constant value. Therefore, for mathematical convenience, the input R is temporarily replaced with a variable input, $x_k$, as shown in FIG. 3.

The input function, $x_k$, can vary in some arbitrary way and we want to design controller 220 so that the plant output $y_k$ tracks $x_k$.

Figure 4:
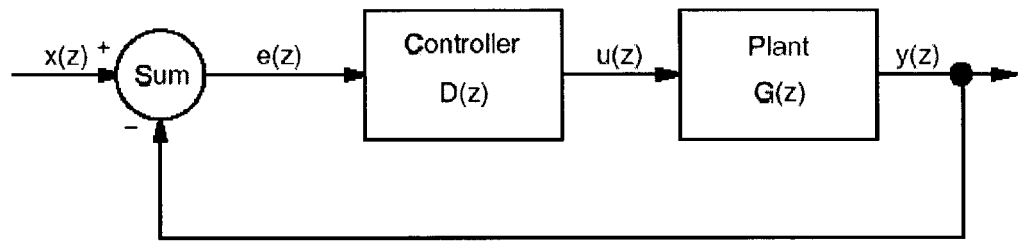
FIG. 4 illustrates a Z transform of the embodiment of FIG. 3.

Applying the Z transform:

$$x(z) \equiv \sum_{k=-\infty}^{\infty} x_k z^{-k} \quad (1)$$

to each of the elements of FIG. 3, we obtain FIG. 4. From that we obtain an expression for the overall transfer function, H(z) in terms of the system elements:

$$H(z) = \frac{y(z)}{x(z)} = \frac{D(z)G(z)}{1 + D(z)G(z)} \quad (2)$$

A transfer function can be expressed as a ratio of polynomials in $z^{-k}$:

$$H(z) = \frac{\sum_{k=1}^{n} a_k z^{-k}}{1 + \sum_{k=1}^{m} b_k z^{-k}} \quad (3)$$

Thus, to solve the control problem, the steps are to: determine the coefficients, $a_k$ and $b_k$ that define the overall transfer function, formulate a model for the plant transfer function, G(z), solve for D(z) in terms of H(z) and G(z), and inverse transform D(z) to obtain a discrete time domain control equation.

To determine H(z), a steady state analysis of the error response is performed:

$$e(z)=x(z)-y(z)=x(z)[1-H(z)] \quad (4)$$

First, the steady state error response to a step input is examined:

$$x_k = \begin{cases} 0 & k < 0 \\ 1 & k \geq 0 \end{cases} \quad (5)$$

The Z transform of the step input is:

$$x(z) = \frac{z}{z-1} \quad (6)$$

The error response to the step input is:

$$e(z) = \left(\frac{z}{z-1}\right)[1 - H(z)] \quad (7)$$

The Z Transform final value theorem shows:

$$\lim_{k \to \infty} f_k = \lim_{z \to 1}\left(\frac{z-1}{z}\right)F(z) \quad (8)$$

If its steady state error response is specified to 0:

$$\lim_{k \to \infty} e_k = 0 \quad (9)$$

Combining with the final value theorem, the steady state response to a step input results:

$$\lim_{z \to 1}[1 - H(z)] = 0 \quad (10)$$

Thus: $\lim_{z \to 1} H(z) = 1 \quad (11)$ $$\text{and } \sum_{k=1}^{n} a_k = 1 + \sum_{k=1}^{m} b_k \quad (12)$$

Similarly, if the steady state error to a ramp input is examined:

$$x_k = Tk \quad (13)$$

The Z transform of the ramp function is:

$$x(z) = \frac{Tz}{(z-1)^2} \tag{14}$$

The error response to the ramp input is:

$$e(z) = \left(\frac{Tz}{(z-1)^2}\right)[1 - H(z)] \tag{15}$$

If its steady error response is specified to be 1/Kv:

$$\lim_{k \to \infty} e_k = 1/K_v \tag{16}$$

Again combining with the final value theorem, the steady state response to a ramp input results:

$$\lim_{z \to 1}\left(\frac{T}{z-1}\right)[1 - H(z)] = 1/K_v \tag{17}$$

Recalling the steady state value of H(z) for a step input, and applying L'Hospital's theorem:

$$\lim_{z \to 1}\frac{dH(z)}{dz} = \frac{-1}{TK_v} \tag{18}$$

Combining this result for m=n=2 with the steady state error for a step input and simplifying, the following is obtained:

$$a_1 = (2+b_1) - (1+b_1+b_2)/(TKv) \tag{19}$$

$$a_2 = (1+b_1+b_2) - a_1 \tag{20}$$

In other words, we select m=n=2 to provide a second order control system. Other embodiments may use higher or lower order systems.

Figure 5:
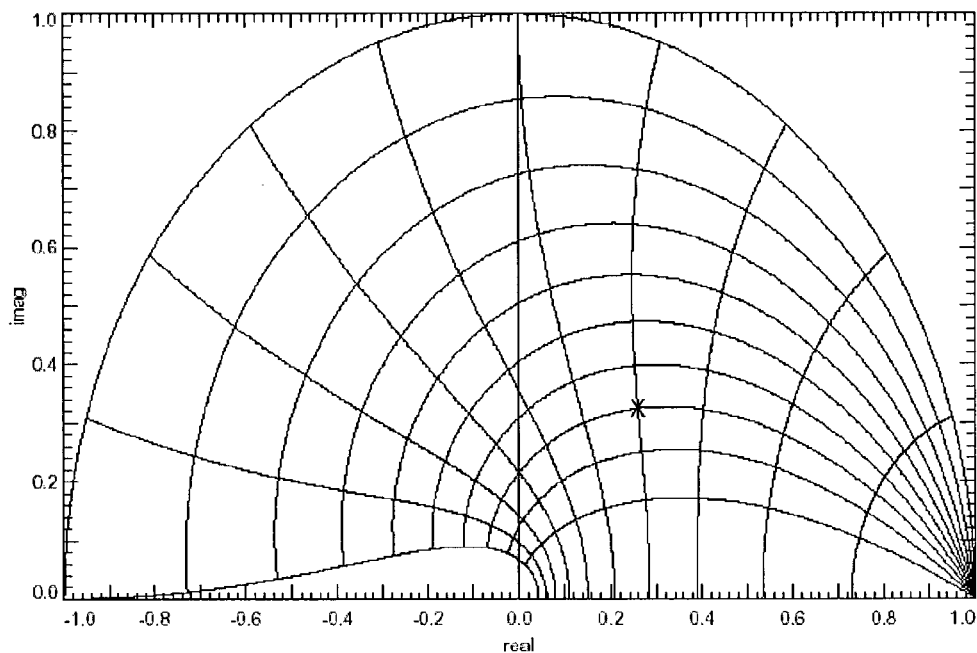
FIG. 5 illustrates one embodiment of a root locus plot.

The denominator of the transfer function, H(z), can be determined through a dynamic analysis using a root locus plot such as that shown in FIG. 5. The figure displays curves of constant damping coefficient, $\xi$, and undamped frequency, $\omega_n$, described by the conjugate pair:

$$(p, p*) = e^{-\xi \omega_n \pm j\omega_n \sqrt{1-\xi^2}} \tag{21}$$

In FIG. 5, the curves of constant $\xi$, increase from 0 to 0.9 as the origin is approached, and $\omega_n$ increases from $0.1\pi$ to $\pi$ going right to left. The damping coefficient is chosen to achieve a balance between how quickly a response damps out and the magnitude of the control values, $u_k$. The magnitude of the control values may be limited by the network connection. For instance, as mentioned above in one embodiment of the control system, control values can vary from 1 bit per second up to about 30 kilo bits per seconds. As $\xi \to 1$, the response settles more quickly, but the magnitude of $u_k$ increases. Values of $\omega_n$ and Kv can be experimented with to achieve a sufficiently quick response.

The position of the poles in FIG. 5 is noted to ensure that a stable yet response system results. To guarantee a bounded response to a bounded input, the poles, p, should be selected so that |p|<1. To ensure the system is responsive, |p| should not be too close to the origin. By iterating over a number of choices of $\xi$, $\omega_n$, and $K_v$, the desired response characteristics are achieved. It is noted that although $K_v$ directly effects only the numerator of H(z), its choice also influences the choice of $\xi$ and $\omega_n$.

Figure 6:
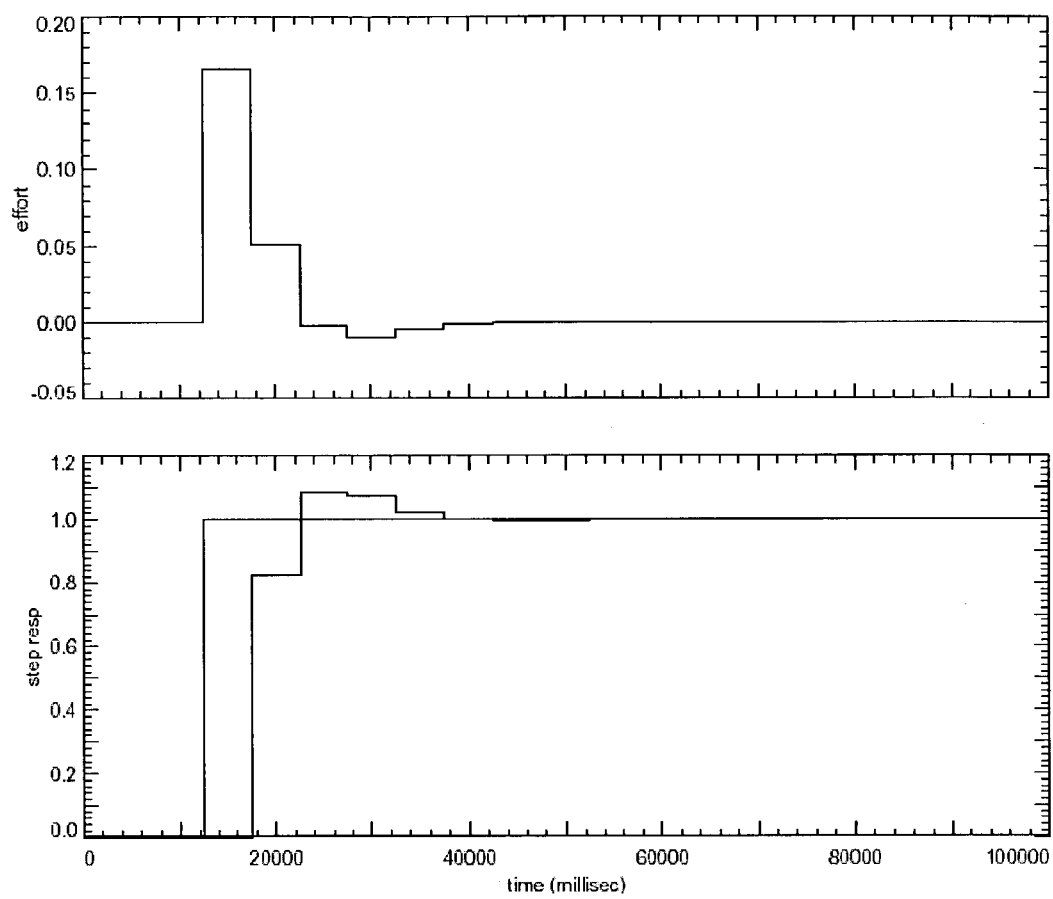
FIG. 6 illustrates embodiments of a step response and its effort response.

The effect of various combinations of $\xi$, $\omega_n$, and can be studied by plotting the step response for various values as is shown for a typical set of values in FIG. 6. The step response curve shows a 10% overshoot and that the system will settle after 4 time steps. The effort curve indicates that every 10 Kbyte change in buffer depth requires a maximum of 1.7 Kbps change in the delivery bandwidth, $u_k$. The negative going effort means the delivery bandwidth should be backed off slightly to correct for the over shoot in the response. The first quadrant pole for the set of and $\omega_n$ that produce the step response showed in FIG. 6 is plotted as an X in FIG. 5.

The conjugate pair of poles (p, p*) derived from this analysis form the denominator of H(z). The poles are easily converted to the coefficients, $b_k$ in the denominator through:

$$b_1 = -(p+p*)$$

$$b_2 = pp*$$

Then, solving for the controller transfer function $$D(z) = \frac{H(z)}{[1 - H(z)]G(z)} \tag{22}$$

The plant integrates the bandwidth, $u_k$, over the sample period, T:

$$y_k = Tu_{k-1} + u_{k-1} \tag{23}$$

Taking the Z transform:

$$y(z) = Tu(z)z^{-1} + y(z)z^{-1} \tag{24}$$

Thus the plant transfer function, G(z), is:

$$G(z) = \frac{y(z)}{u(z)} = \frac{Tz^{-1}}{1 - z^{-1}} \tag{25}$$

Now, solving for the controller transfer function, D(z), in terms of the overall transfer function, H(z), and the plant transfer function G(z):

$$D(z) = \frac{u(z)}{e(z)} = \frac{a_1 + (a_2 - a_1)z^{-1} - a_2 z^{-2}}{T(1 + (b_1 - a_1)z^{-1} + (b_2 - a_2)z^{-2})} \tag{26}$$

Finally, taking the inverse Z transform gives the discrete time control equation:

$$u_k = [a_1 e_k + (a_2 - a_1)e_{k-1} - a_2 e_{k-2}]/T - (b_1 - a_1)u_{k-1} - (b_2 - a_2)u_{k-1} \tag{27}$$

The coefficients $b_k$, result from the dynamic analysis of the transfer function, and the coefficients $a_k$ are computed from the steady state analysis.

Finally, the controller may be deployed. Recall that the fixed reference control system was transformed into a tracking control system by replacing reference buffer depth R in FIG. 2 with $x_k$ in FIG. 3 in order to derive a closed form transfer function. However, the system to be deployed works against the reference, R, and $y_k$ varies according to dynamics that are difficult to predict, but the value of $y_k$ is available at any sample instant. Thus the error, $e_k$, in equation (27) is computed as:

$$e_k = R - y_k \qquad (28)$$

The boundary conditions for the control system are established by filling the buffer to R at some initial rate, initializing the history of $u_k$ with the initial rate $u_o$, and initializing the history of $e_k$ with 0, since the buffer has been filled to depth R. Then, the control system is started, $y_k$ sampled every T seconds, and $e_k$ computed with equation (28), an updated value of $u_k$ is computed with equation (27), and the value $u_k$ is sent to the server. We assume that the server adjusts its send rate so that the average bandwidth over the next sample period is be $u_k$.

Other embodiments of the present invention may use a wide variety of control theory approaches to design the specific control equations for the buffer depth control system.

Example Embodiments

Once control theory has been used to determine control system equations as shown above, the equations can be used in a wide variety of embodiments of the present invention. FIGS. 7 through 13 illustrate some exemplary embodiments and illustrate a number implementation specific details. Other embodiments may not include all of the illustrated elements, may combine and/or separate one or more of the illustrated elements, and/or include additional elements not illustrated.

Figure 7:
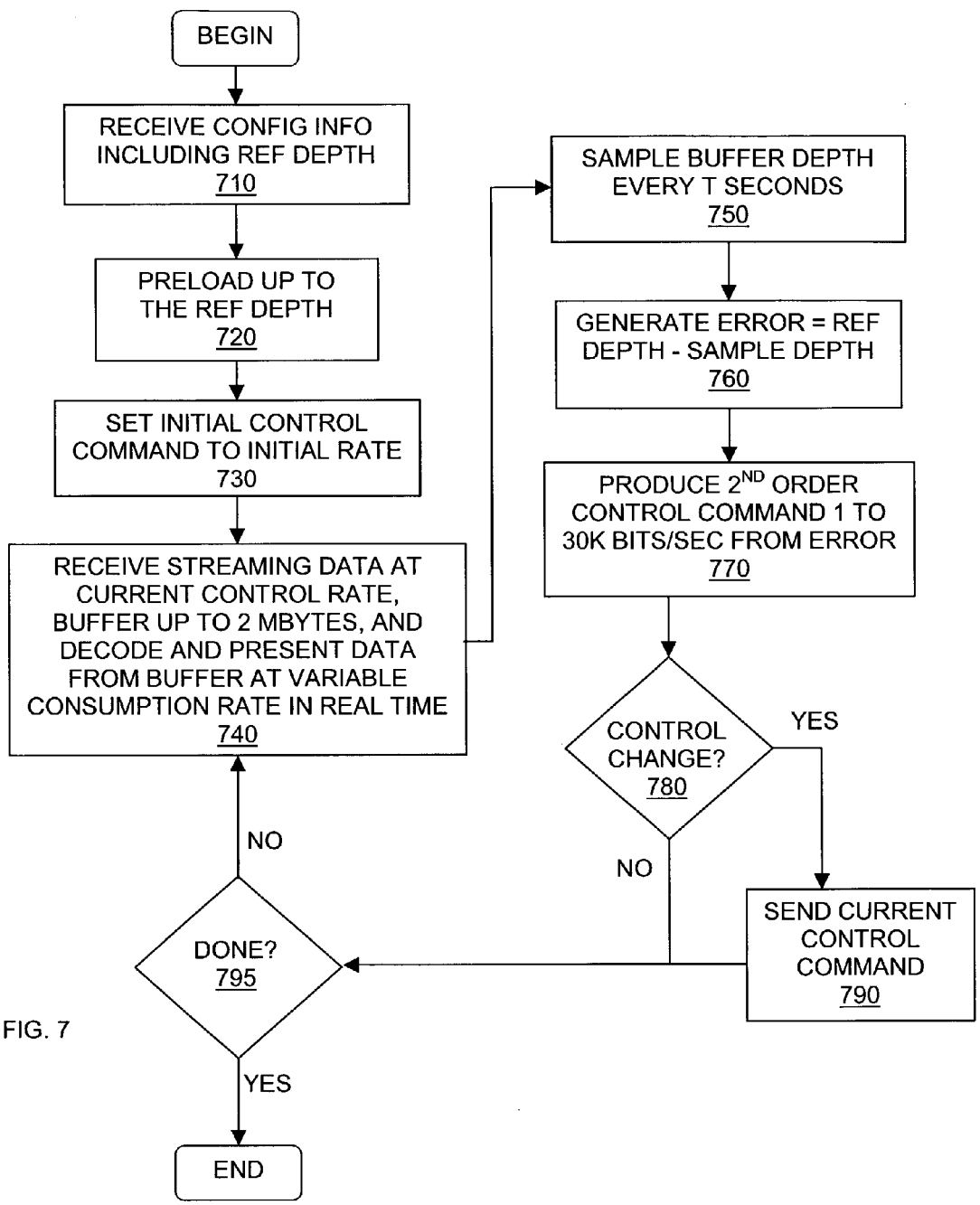
FIG. 7 demonstrates one embodiment of the control system from the perspective of a client.

FIG. 7 demonstrates one embodiment of the buffer management system from the perspective of the client. At a high level, the client receives streaming data at a particular rate, buffers the streaming data, and consumes the data from the buffer at another rate. Then, using the buffer depth, the client generates a sequence of signals and sends the signals to a server to dynamically adjust the rate at which the streaming data is received.

In the specific illustrated embodiment, the client receives configuration information at 710. The configuration information includes a reference buffer depth. At 720, the data begins streaming to the client and the client preloads the buffer up to the reference depth. At 730, an initial control command is set to the initial rate at which the streaming data is received when the reference depth is reach. Then, at 740, the client continues to receive the streaming data at the current data rate, buffers the data, and consumes data out of the buffer at a variable rate for decoding and presentation in real time. A typical buffer size for a 30 kilobit per second wireless connection may be 30 to 40 kilobytes.

As the data stream is processed, the client performs a command control function cycling through elements 750 through 790. At 750, the client samples the buffer depth to start another cycle of the control function once every T seconds. In one embodiment, the sample period T may be five seconds and T may be equal to the minimum time allowed between server control commands in the particular network setting. Other embodiments may use different values of T.

For each sample of the buffer depth, the client generates an error value at 760. The error value is equal to the reference depth minus the sampled buffer depth. At 770, the client produces a second order control command based on the error value. In the illustrated embodiment, the control command indicates a data rate for the streaming data in a range from 1 bit/second up to 30 Kbits/second.

In the illustrated embodiment, the client determines at 780 whether or not the control command indicates a change in the data rate from a previous sample period. If a change is indicated, the control command is sent to the server at 790 to adjust the data rate. After sending the control command, or if no change is indicated, the client checks for the end of the streaming data at 795. If the streaming data is done, the client plays out the remaining data in the buffer and the control process ends. If the streaming data is not done, the client returns to 740 to continue processing the data stream and cycle through another period of the control function.

Figure 8:
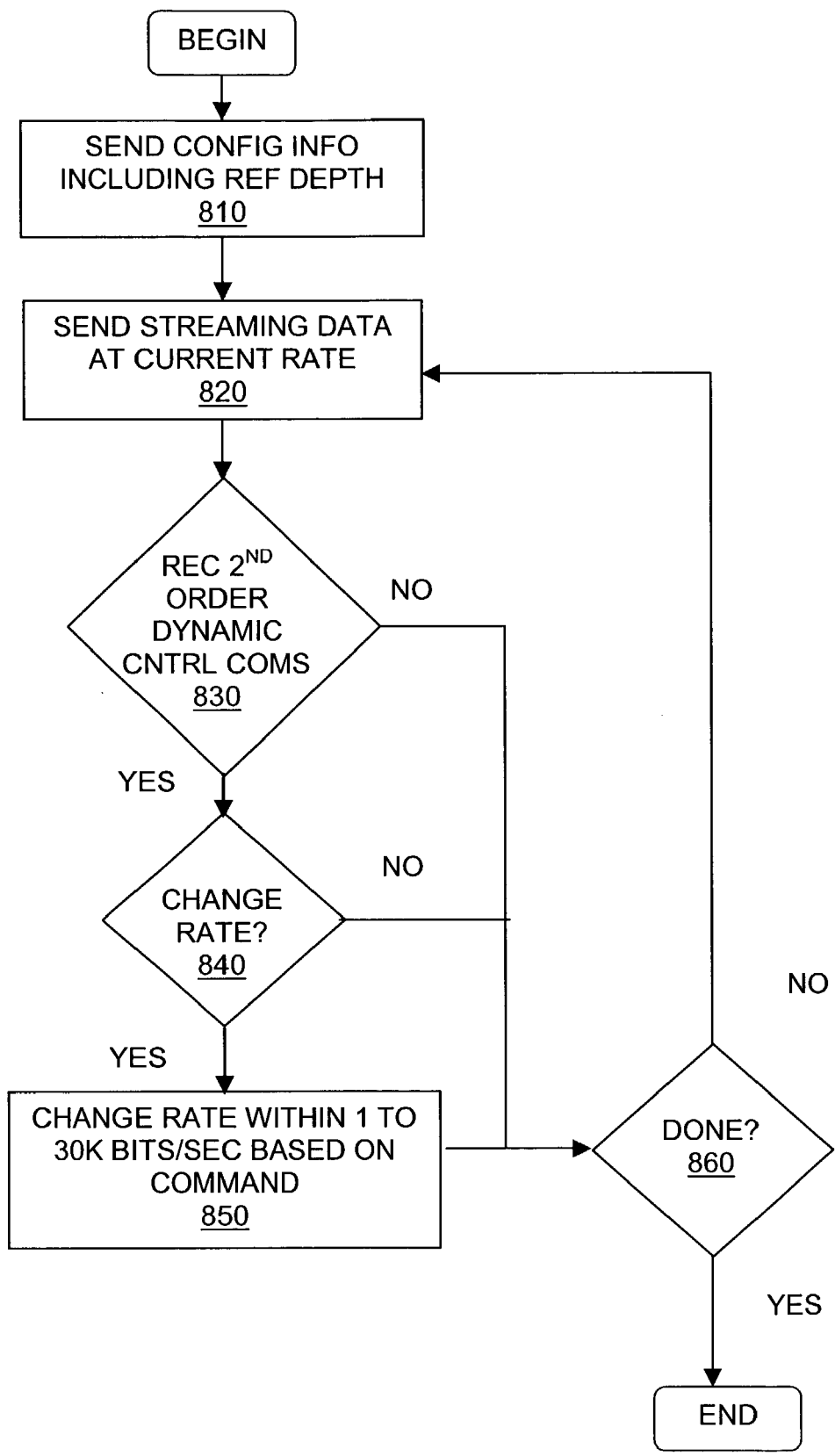
FIG. 8 demonstrates one embodiment of the control system from the perspective of a server.

FIG. 8 demonstrates one embodiment of the present invention from the perspective of the server. At a high level, the server provides streaming data at a particular rate and dynamically changes the rate based on a sequence of signals received from the client.

In the specific illustrated embodiment, the server sends configuration information at 810. The configuration information includes the reference buffer depth. As discussed above, the reference buffer depth can be determined in any number of ways, and may depend on a wide range of factors. Usually, the reference depth is intended to be a "safe" starting point for processing streaming data given a particular hardware and software system, having enough data buffered to provide a smooth presentation with a low probability of underflow, and leaving enough room in the buffer to store more data with a low probability of overflow. In other embodiments, the configuration data may not include R, but the client may derive R from the configuration data.

At 820, the server begins streaming the data at a particular data rate. At 830, the server checks for a second order dynamic control command from the client. If no command is received, the process proceeds to 860. If a command is received, the server determines whether or not the control command indicates a change in the current data rate at 840. If the command indicates a change, the server changes the rate at 850 based on the command. In the illustrated embodiment, the rate can fall within a range between 1 bit per second up to 30 Kbits per second.

If no command is received at 830, or no change is indicated at 840, or after a change has been implemented at 850, the server then checks to determine if the streaming data is done at 860. If the data is done, the process ends. If the data is not done, the process returns to 820 to continue sending the streaming data and to continue monitoring for rate changes.

Other embodiments of the present invention may divide the functions between the server and the client differently. For instance, in one embodiment of the present invention, the client samples the buffer depth and sends the value of the sample back to the server. Then, the server generates an error value based on the sample and generates the dynamic control command based on the error value. In yet another embodiment, the client samples the buffer depth, generates the error value, and sends the error value back to the server. Then, the server generates the dynamic control command based on the error value.

Of course, in embodiments where the server generates the error value, the server also has the reference value rather than, or in addition to, the client. If, in this situation, the client derives the reference value from the configuration information provided by the server, the client also sends the reference value back to the server.

Figure 9:
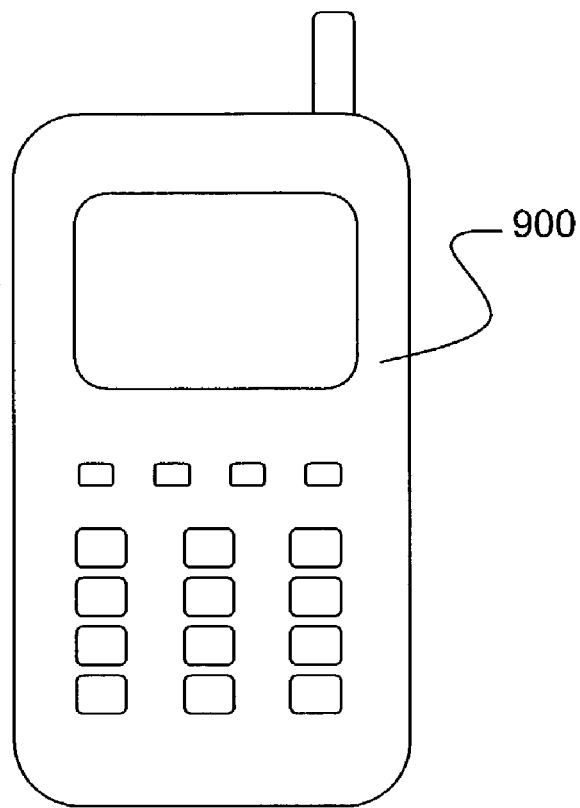
FIG. 9 illustrates one embodiment of a wireless client device.

FIG. 9 illustrates one embodiment of a wireless client device 900 which may use embodiments of the present invention. Wireless client device 900 represents a wide category of wireless devices including, for instance, cellular phones, personal data assistants, and wireless email devices.

Figure 10:
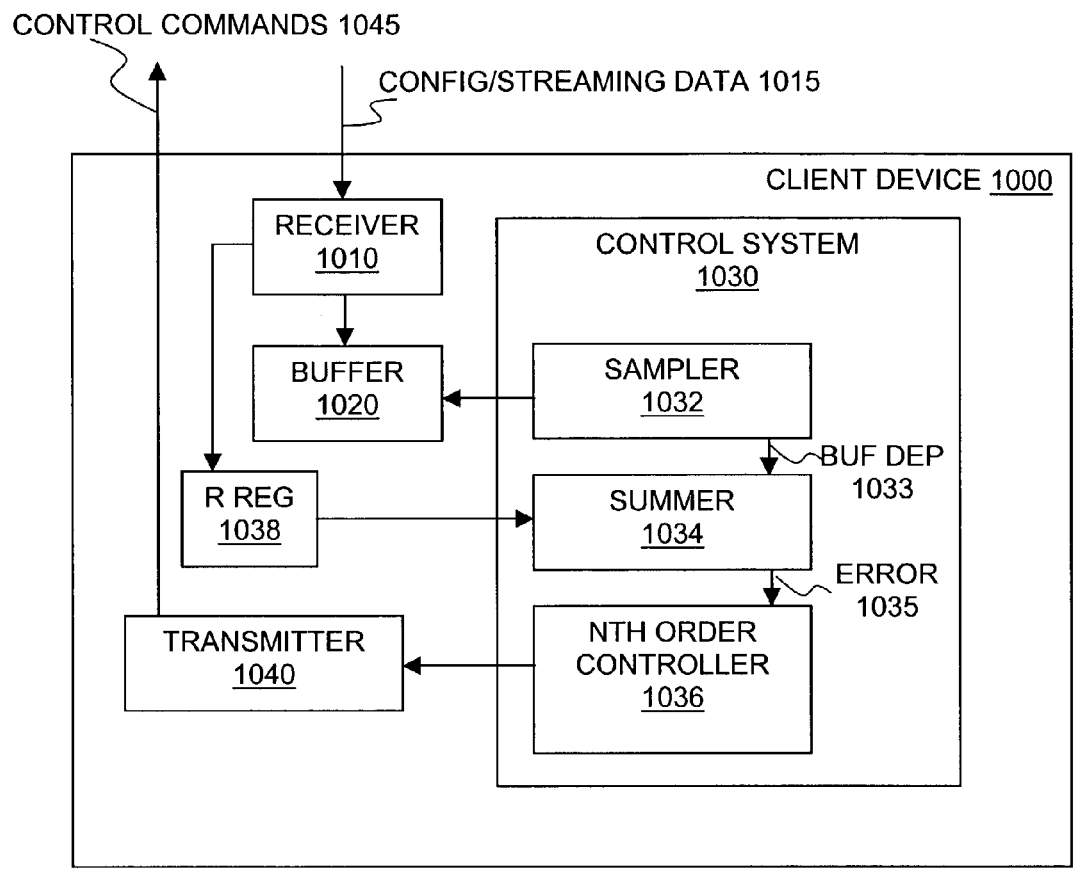
FIG. 10 illustrates one embodiment of a block diagram of a client device.

FIG. 10 illustrates one embodiment of a client device, client device 1000, in block-diagram form. Client device 1000 includes receiver 1010, buffer 1020, and reference register 1038. Receiver 1010 receives the configuration information and/or streaming data 1015. The configuration information includes the reference buffer depth, R, which is stored in register 1038. The streaming data is buffered in buffer 1020.

Client device 1000 also includes control system 1030. Control system 1030 includes sampler 1032, summer 1034, and Nth order controller 1036. Sampler 1032 samples the buffer depth 1033 of buffer 1020 once every T seconds. The sampled buffer depths 1033 are provided to summer 1034 along with the reference depth, R, from register 1038. Summer 1034 determines an error value 1035 for each sampled buffer depth 1033 based on the difference between a give sampled buffer depth 1033 and the reference buffer depth R. The error values 1035 are used by controller 1036 to generate a sequence of dynamic control commands 1045. Client device 1000 includes transmitter 1040 to transmit the sequence of control commands 1045 to the server device that is sending the streaming data.

Figure 11:
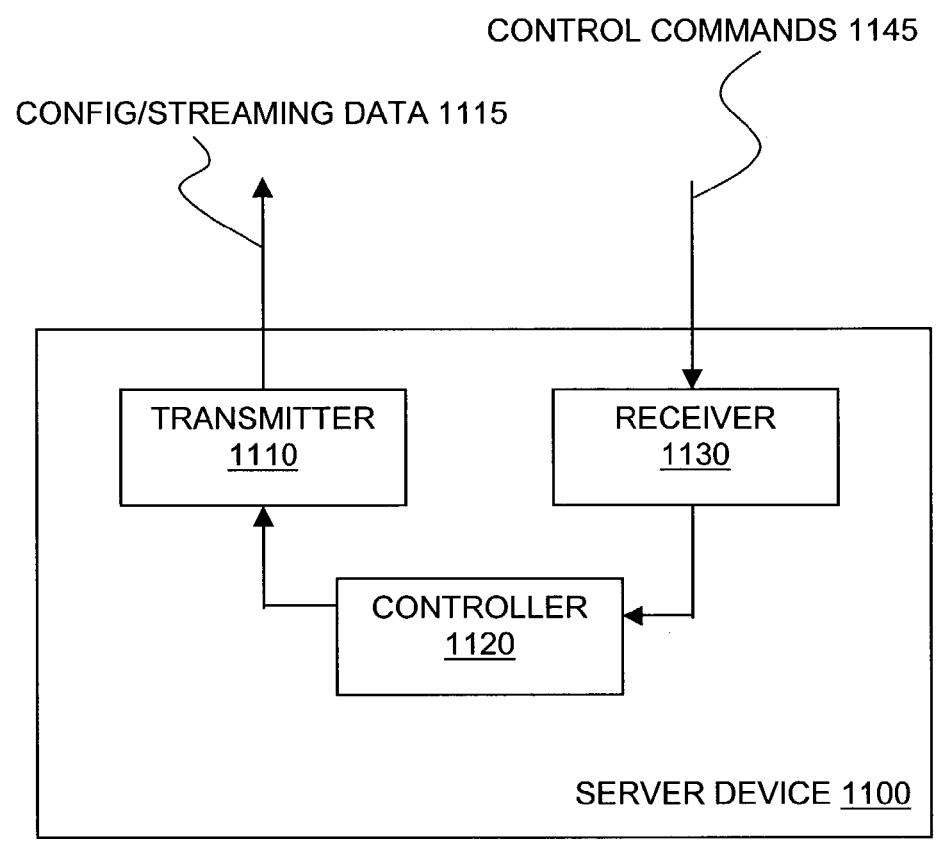
FIG. 11 illustrates one embodiment of a block diagram of a server device.

FIG. 11 illustrates one embodiment of a server device, server device 1100, in block-diagram form. Server device 1100 includes transmitter 1110, controller 1120, and receiver 1130. Transmitter 1110 transmits configuration information and streaming data 1115 to a wireless client device. The wireless client device returns a sequence of dynamic control commands 1145, which are received by receiver 1130. Controller 1120 uses the sequence of commands 1145 to appropriately adjust the data rate of the streaming data 1115 to indirectly manage the buffer depth of the streaming data on the wireless client device.

Other embodiments may divide the components of the present invention differently between the client device and the server device. For instance, as discussed above, the server may determine the error values and/or generate the dynamic control commands. In which case, the server may include the summer and/or controller.

In one embodiment of the present invention, the server and client are both part of one device connected by an internal network. For instance, the server and client could be software routines executed on the same machine, and/or hardware components within the same machine. Of course, as discussed above, the server and client could also be on separate machines, comprising software routines and/or hardware components on those separate machines.

Figure 12:
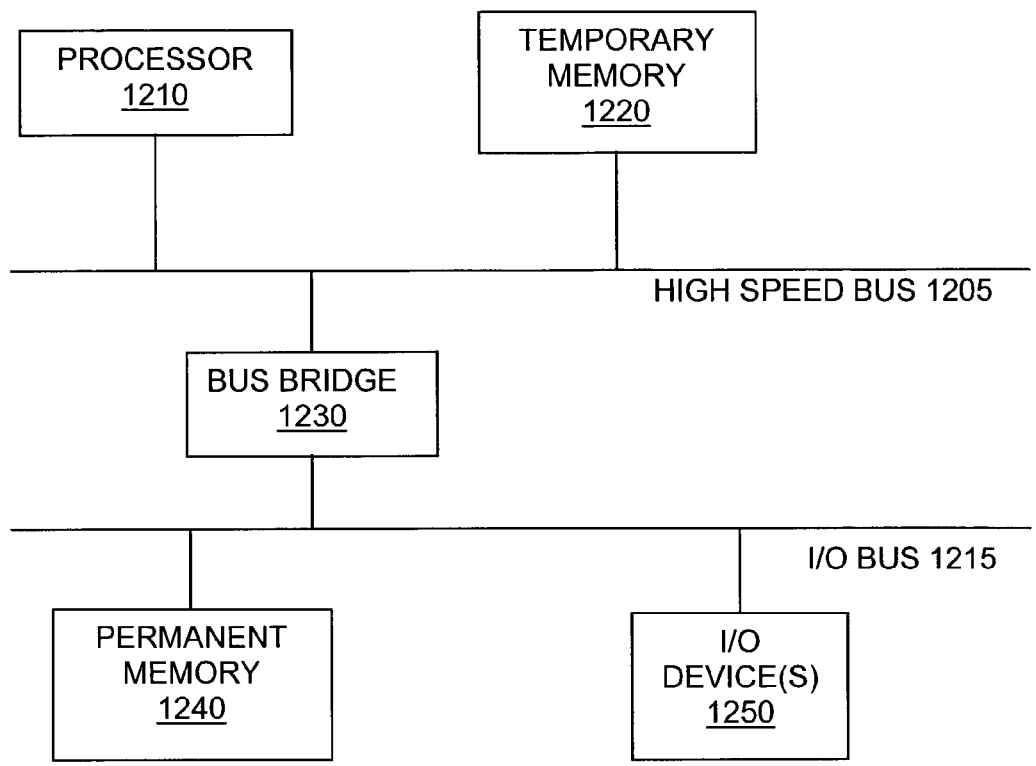
FIG. 12 illustrates one embodiment of a generic hardware system.

FIG. 12 illustrates one embodiment of a generic hardware system intended to represent a broad category of computer systems such as personal computers, workstations, and/or embedded systems. In the illustrated embodiment, the hardware system includes processor 1210 coupled to high speed bus 1205, which is coupled to input/output (I/O) bus 1215 through bus bridge 1230. Temporary memory 1220 is coupled to bus 1205. Permanent memory 1240 is coupled to bus 1215. I/O device(s) 1250 is also coupled to bus 1215. I/O device(s) 1250 may include a display device, a keyboard, one or more external network interfaces, etc.

Certain embodiments may include additional components, may not require all of the above components, or may combine one or more components. For instance, temporary memory 1220 may be on-chip with processor 1210. Alternately, permanent memory 1240 may be eliminated and temporary memory 1220 may be replaced with an electrically erasable programmable read only memory (EEPROM), wherein software routines are executed in place from the EEPROM. Some implementations may employ a single bus, to which all of the components are coupled, or one or more additional buses and bus bridges to which various additional components can be coupled. Similarly, a variety of alternate internal networks could be used including, for instance, an internal network based on a high speed system bus with a memory controller hub and an I/O controller hub. Additional components may include additional processors, a CD ROM drive, additional memories, and other peripheral components known in the art.

In one embodiment, the present invention, as described above, could be implemented using one or more hardware systems such as the hardware system of FIG. 12. Where more than one computer is used, the systems can be coupled to communicate over an external network, such as a local area network (LAN), an internet protocol (IP) network, etc. In one embodiment, the buffer management system described above may be implemented as software routines executed by one or more execution units within the computer(s). For a given computer, the software routines can be stored on a storage device, such as permanent memory 1240.

Figure 13:
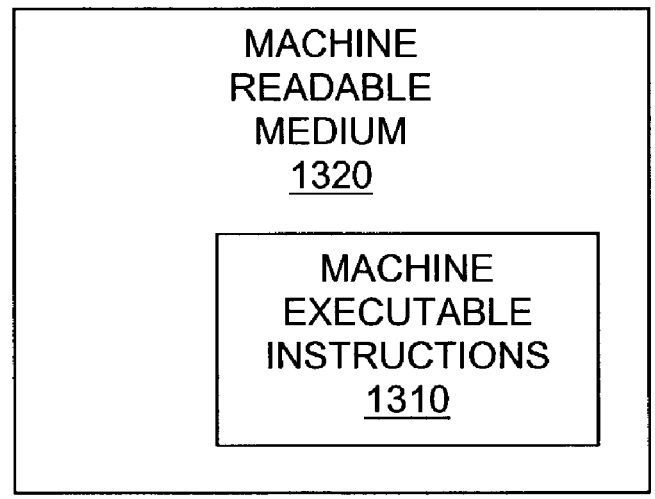
FIG. 13 illustrates one embodiment of a machine-readable medium to store executable instructions for embodiments of the buffer management system.

Alternately, as shown in FIG. 13, the software routines can be machine executable instructions 1310 stored using any machine readable storage medium 1320, such as a diskette, CD-ROM, magnetic tape, digital video or versatile disk (DVD), laser disk, ROM, Flash memory, etc. The series of instructions need not be stored locally, and could be received from a remote storage device, such as a server on a network, a CD ROM device, a floppy disk, etc., through, for instance, I/O device(s) 1250 of FIG. 12.

From whatever source, the instructions may be copied from the storage device into temporary memory 1220 and then accessed and executed by processor 1210. In one implementation, these software routines are written in the C programming language. It is to be appreciated, however, that these routines may be implemented in any of a wide variety of programming languages.

In alternate embodiments, the buffer management system described above may be implemented in discrete hardware or firmware. For example, one or more application specific integrated circuits (ASICs) could be programmed with one or more of the above described functions of the present invention. In another example, one or more functions of the present invention could be implemented in one or more ASICs on additional circuit boards and the circuit boards could be inserted into the computer(s) described above. In another example, field programmable gate arrays (FPGAs) or static programmable gate arrays (SPGA) could be used to implement one or more functions of the present invention. In yet another example, a combination of hardware and software could be used to implement one or more functions of the present invention.

Thus, buffer management for streaming data is described. Whereas many alterations and modifications of the present invention will be comprehended by a person skilled in the art after having read the foregoing description, it is to be understood that the particular embodiments shown and described by way of illustration are in no way intended to be considered limiting. Therefore, references to details of particular embodiments are not intended to limit the scope of the claims.

What is claimed is:

1. A method comprising:
   receiving streaming data from a server at a first data rate;
   obtaining configuration information for the streaming data, said configuration information including a reference data depth;
   preloading a buffer having a finite size with the streaming data up to the reference data depth;
   buffering the streaming data in the buffer;
   consuming the streaming data from the buffer at a second data rate, said second data rate being variable;
   generating a substantially continuous sequence of dynamic control commands based on the data depth of the buffer relative to the reference data depth and based on at least one previous dynamic control command in the sequence of dynamic control commands; and using the substantially continuous sequence of dynamic control commands to adjust the first data rate to indirectly influence the data depth of the buffer toward the reference data depth whenever the data depth of the buffer deviates from the reference data depth;

wherein generating the sequence of dynamic control commands comprises:

taking a sample of the data depth of the buffer once every T seconds;

generating an error signal equal to a difference between the sample of the data depth and the reference depth;

applying the error signal to an Nth order controller; and producing a dynamic control command for each sample of the data depth.

2. The method of claim 1 wherein the buffer is in a device having at least one of less than two mega bytes of memory and a processor speed of less than 200 mega hertz.

3. The method of claim 1 wherein the buffer is in a device comprising one of a cellular phone, a personal data assistant, and a wireless email device.

4. The method of claim 1 wherein the first data rate is adjustable in a continuous range from 1 bit per second up to a maximum data rate of a network connection between the server and the client containing the buffer.

5. The method of claim 4 wherein the maximum data rate comprises 30 kilo bits per second over a wireless network connection.

6. The method of claim 1 wherein the streaming data comprises audio/video content, and wherein consuming the streaming data comprises decoding and presenting the audio/video content in real time.

7. The method of claim 1 wherein taking the sample comprises:

taking the sample on a client device containing the buffer; and sending the sample to a server.

8. The method of claim 1 wherein in generating the error signal comprises:

generating the error signal on a client device containing the buffer; and sending the error signal to the server.

9. The method of claim 1 wherein the server performs at least one of generating the error signal, applying the error signal, and producing the dynamic control command.

10. The method of claim 1 wherein at least one of T is less than or equal to 5 seconds and the Nth order controller comprises a second order controller.

11. The method of claim 1, further comprising rendering the streamed data beginning when the data depth first reaches the reference data depth.

12. The method of claim 1 wherein using the sequence of dynamic control commands comprises:

sending the dynamic control commands to the server.

13. The method of claim 1 wherein using the sequence of dynamic control commands comprises: changing the first data rate.

14. The method of claim 1 wherein the dynamic control command indicates an adjustment in the first data rate that is directly related to a magnitude of the error signal.

15. A method comprising:

sending configuration information for streaming data to a client, said configuration information including a reference data depth, said client to preload a buffer having a finite size with the streaming data up to the reference data depth;

sending the streaming data to a client at a first data rate, said client to buffer the streaming data in the buffer, and to consume the streaming data from the buffer at a second data rate, said second data rate being variable;

receiving a sequence of indicators from the client of a depth of the buffer relative to a reference data depth, the sequence of indicators based on the buffer depth relative to the reference buffer depth, based on at least one previous indicator in the sequence of indicators, and transmitted whenever the buffer depth deviates from the reference buffer depth; and dynamically adjusting the first data rate based on the sequence of indicators to indirectly influence the data depth of the buffer toward the reference data depth;

wherein the sequence of indicators comprises one of a sequence of samples of the buffer depth, a sequence of error values equal to a difference between a sample of the buffer depth and the reference data depth, and a sequence of dynamic control commands based on the sequence of error values.

16. The method of claim 15 wherein the first data rate is adjustable in a continuous range from 1 bit per second up to a maximum data rate of a network connection between a server and the client.

17. The method of claim 15 wherein receiving the sequences of indicators comprises: receiving only those indicators that indicate a change in the first data rate.

18. A method comprising:

transmitting configuration information for streaming data from a server to a client, said configuration information including a reference data depth;

transmitting the streaming data from the server to the client at a first data rate;

preloading a buffer having a finite size with the streaming data up to the reference data depth;

buffering the streaming data in the buffer;

consuming the streaming data from the buffer at a second data rate, said second data rate being variable;

generating a substantially continuous sequence of dynamic control commands based on the data depth of the buffer relative to the reference data depth and based on at least one previous dynamic control command in the sequence of dynamic control commands; and adjusting the first data rate based on the substantially continuous sequence of dynamic control commands to indirectly influence the data depth of the buffer toward the reference data depth whenever the data depth of the buffer deviates from the reference data depth;

wherein generating the sequence of dynamic control commands comprises:

taking a sample of the data depth of the buffer once every T seconds;

generating an error signal equal to a difference between the sample of the data depth and the reference depth;

applying the error signal to an Nth order controller and producing a dynamic control command for each sample of the data depth.

19. The method of claim 18 wherein the first data rate is adjustable in a continuous range from 1 bit per second up to a maximum data rate of a network connection between the server and the client.

20. The method of claim 18 wherein the streaming data comprises audio/video content, and wherein consuming the streaming data comprises decoding and presenting the audio/video content in real time.

21. A non-transitory machine readable medium having stored thereon machine executable instructions, the execution of which to implement a method comprising:
   receiving configuration information for streaming data, said configuration information including a reference data depth;
   receiving streaming data from a server at a first data rate;
   preloading a buffer having a finite size with the streaming data up to the reference data depth;
   buffering the streaming data in the buffer;
   consuming the streaming data from the buffer at a second data rate, said second data rate being variable;
   generating a substantially continuous sequence of dynamic control commands based on a data depth of the buffer relative to the reference data depth and based on at least one previous dynamic control command in the sequence of dynamic control commands; and
   whenever the data depth of the buffer deviates from the reference data depth, using the sequence of dynamic control commands to adjust the first data rate to indirectly influence the data depth of the buffer toward the reference data depth;
   wherein generating the sequence of dynamic control commands comprises:
      taking a sample of the data depth of the buffer once every T seconds;
      generating an error signal equal to a difference between the sample of the data depth and the reference depth;
      applying the error signal to an Nth order controller; and
      producing a dynamic control command for each sample of the data depth.

22. The machine readable medium of claim 21 wherein, prior to consuming the streaming data, the method further comprises:
   receiving configuration information for the streaming data, said configuration information including the reference data depth; and
   preloading the buffer with the streaming data up to the reference data depth.

23. The machine readable medium of claim 21 wherein taking the sample comprises:
   taking the sample on a client device containing the buffer; and
   sending the sample to a server.

24. The machine readable medium of claim 21 wherein in generating the error signal comprises:
   generating the error signal on a client device containing the buffer; and
   sending the error signal to the server.

25. The machine readable medium of claim 21 wherein the server performs at least one of generating the error signal, applying the error signal, and producing the dynamic control command.

26. The machine readable medium of claim 21 wherein using the sequence of dynamic control commands comprises:
   determining when the sequences of dynamic control commands indicates a change in the first data rate; and
   only using those dynamic control commands to the server.

27. The machine readable medium of claim 21 wherein using the sequence of dynamic control commands comprises:
   sending the dynamic control commands to the server.

28. The machine readable medium of claim 21 wherein using the sequence of dynamic control commands comprises: changing the first data rate.

29. The machine readable medium of claim 21 wherein the machine readable medium comprises a segment of memory used by the server and a segment of memory used by a client.

30. A non-transitory machine readable medium having stored thereon machine executable instructions, the execution of which to implement a method comprising:
   sending configuration information for streaming data to a client, said configuration information including a reference data depth, said client to preload a buffer having a finite size with the streaming data up to the reference data depth;
   sending streaming data to said client at a first data rate, said client to buffer the streaming data in the buffer, and to consume the streaming data from the buffer at a second data rate, said second data rate being variable;
   receiving a sequence of indicators from the client of a depth of the buffer relative to the reference data depth, the sequence of indicators based on the buffer depth relative to the reference buffer depth, based on at least one previous indicator in the sequence of indicators, and transmitted whenever the data depth deviates from the reference data depth; and
   dynamically adjusting the first data rate based on the sequence of indicators to indirectly influence the data depth of the buffer toward the reference data depth;
   wherein the sequence of indicators comprises one of a sequence of samples of the buffer depth, a sequence of error values equal to a difference between a sample of the buffer depth and the reference data depth, and a sequence of dynamic control commands based on the sequence of error values.

31. The machine readable medium of claim 30 wherein the first data rate is adjustable in a continuous range from 1 bit per second up to a maximum data rate of a network connection between a server and the client.

32. The machine readable medium of claim 30 wherein receiving the sequences of indicators comprises:
   receiving only those indicators that indicate a change in the first data rate.

33. A client device comprising:
   a receiver to receive configuration information for streaming data, said configuration information including a reference data depth and to receive streaming data from a server device at a first rate;
   a buffer to preload with the streaming data up to the reference data depth, to buffer the streaming data, and to provide the streaming data for consumption at a second rate, said buffer having a finite size, and said second data rate being variable;
   a control system to generate a substantially continuous sequence of dynamic control commands based on a data depth of the buffer relative to the reference data depth and based on at least one previous dynamic control command in the sequence of dynamic control commands;
   a transmitter to send the sequence of dynamic control commands to the server device to adjust the first data rate to indirectly influence the data depth of the buffer toward the reference data depth whenever the data depth of the buffer deviates from the reference data depth;
   wherein the control system comprises:
      a sampler to take a sample of the data depth of the buffer once every T seconds;
      a summer to generate an error signal equal to a difference between the sample of the data depth and the reference depth; and an Nth order controller to produce a dynamic control command for each sample of the data depth based at least in part on the error signal.

34. The client device of claim 33 wherein the client device comprises one of a cellular phone, a personal data assistant, and a wireless email device.

35. A server device comprising:
a transmitter to send configuration information for streaming data to a client, said configuration information including a reference data depth, said client to preload a buffer having a finite size with the streaming data up to the reference data depth, and to send streaming data to a client device at a first data rate, said client device to buffer the streaming data in the buffer, and to consume the streaming data from the buffer at a second data rate, said second data rate being variable;
a receiver to receive a sequence of indicators from the client device of a depth of the buffer relative to the reference data depth, the sequence of indicators based on the buffer depth relative to the reference buffer depth, based on at least one previous indicator in the sequence of indicators, and transmitted whenever the data depth deviates from the reference data depth; and
an Nth order controller to dynamically adjust the first data rate based on the sequence of indicators to indirectly influence the data depth of the buffer toward the reference data depth;
wherein the sequence of indicators comprises one of a sequence of samples of the buffer depth, a sequence of error values equal to a difference between a sample of the buffer depth and the reference data depth, and a sequence of dynamic control commands based on the sequence of error values;
wherein the transmitter further sends configuration information for the streaming data to the client, said configuration information including the reference data depth, said client to preload the buffer with the streaming data up to the reference data depth.

36. The server device of claim 35 wherein the first data rate is adjustable in a continuous range from 1 bit per second up to a maximum data rate of a network connection between the server and the client.

37. The server device of claim 35 wherein the receiver receives only those indicators that indicate a change in the first data rate.

38. A system comprising:
a server device and a client device,
said server device to transmit configuration information for streaming data to said client device, said configuration information including a reference data depth; and
said client to preload a buffer having a finite size with the streaming data up to the reference data depth;
said server device to transmit the streaming data to the client device at a first data rate;
said client device to buffer the streaming data in the buffer and provide the streaming data from the buffer for consumption at a second rate, said second data rate being variable;
said client device to generate a substantially continuous sequence of dynamic control commands based on the data depth relative to the reference data depth and based on at least one previous dynamic control command in the sequence of dynamic control commands, and transmit the sequence of indicators to the server device whenever the data depth of the buffer deviates from the reference data depth;
said server device to dynamically adjust the first data rate based on the sequence of indicators to indirectly influence the data depth of the buffer toward the reference data depth;
wherein the sequence of indicators comprises a sequence of error signals, wherein each error signal is equal to a difference between a sample of the data depth and the reference data depth;
wherein the sequence of indicators comprises a sequence of dynamic control commands wherein each dynamic control command is generated based on an error signal applied to an Nth order controller.

39. The system of claim 38 wherein the sequence of indicators comprises a sequence of samples of the buffer depth.

40. An apparatus comprising:
a processor; and
a memory device coupled to the processor to store executable instructions that when executed by the processor implement a method comprising:
receiving configuration information for streaming data, said configuration information including a reference data depth;
receiving streaming data from a server at a first data rate;
preloading a buffer having a finite size with the streaming data up to the reference data depth;
buffering the streaming data in the buffer;
consuming the streaming data from the buffer at a second data rate, said second data rate being variable;
generating a substantially continuous sequence of dynamic control commands based on the data depth relative to the reference data depth and based on at least one previous dynamic control command in the sequence of dynamic control commands; and
using the sequence of dynamic control commands to adjust the first data rate to indirectly influence the data depth of the buffer toward the reference data depth whenever the data depth of the buffer deviates from the reference data depth;
wherein using the sequence of dynamic control commands comprises:
taking a sample of the data depth of the buffer once every T seconds;
generating an error signal equal to a difference between the sample of the data depth and the reference depth;
applying the error signal to an Nth order controller; and
producing a dynamic control command for each sample of the data depth.

41. The apparatus of claim 40 wherein taking the sample comprises:
taking the sample on a client device containing the buffer; and
sending the sample to a server.

42. The apparatus of claim 40 wherein in generating the error signal comprises:
generating the error signal on a client device containing the buffer; and
sending the error signal to the server.

43. The apparatus of claim 40 wherein using the sequence of dynamic control commands comprises:
sending the dynamic control commands to the server.

44. An apparatus comprising:
a processor; and
a memory device coupled to the processor to store executable instructions that when executed by the processor implement a method comprising:
sending configuration information for streaming data to a client device, said configuration information including a reference data depth, said client to preload a buffer having a finite size with the streaming data up to the reference data depth;

sending streaming data to the client at a first data rate, said client to buffer the streaming data in the buffer, and to consume the streaming data from the buffer at a second data rate, said second data rate being variable;

receiving a substantially continuous sequence of indicators from the client of a depth of the buffer relative to the reference data depth, the sequence of indicators transmitted whenever the data depth deviates from the reference data depth, based on the buffer depth relative to the reference buffer depth, and based on at least one previous indicator in the sequence of indicators; and dynamically adjusting the first data rate based on the sequence of indicators to indirectly influence the data depth of the buffer toward the reference data depth;

wherein the sequence of indicators comprises one of a sequence of samples of the buffer depth, a sequence of error values equal to a difference between a sample of the buffer depth and the reference data depth, and a sequence of dynamic control commands based on the sequence of error values.

45. The apparatus of claim 44 wherein receiving the sequence of indicators comprises: receiving only those indicators that indicate a change in the first data rate.

\* \* \* \* \*